Oct. 28, 1969   B. R. BLIGH   3,474,636
PURIFICATION PROCESS
Filed Nov. 29, 1965   3 Sheets-Sheet 1
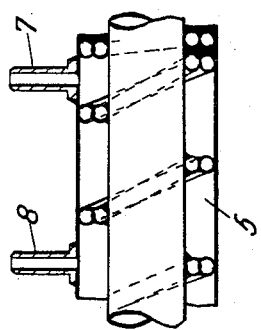
Fig.1
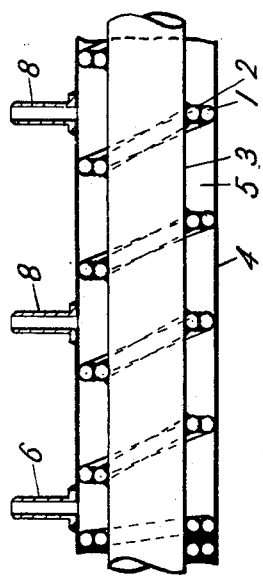
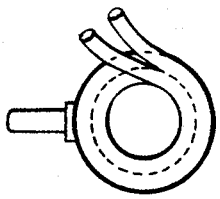
Fig.2
Inventor
Bernard Ramsay Bligh
By
Cushman, Darby & Cushman
Attorney Oct. 28, 1969  B. R. BLIGH  3,474,636
PURIFICATION PROCESS Filed Nov. 29, 1965  3 Sheets-Sheet 3

INVENTOR
BERNARD RAMSAY BLIGH

BY
Cushman, Darby & Cushman
ATTORNEYS

# United States Patent Office 3,474,636
Patented Oct. 28, 1969

3,474,636
PURIFICATION PROCESS
Bernard Ramsay Bligh, Norton-on-Tees, England, assignor to Imperial Chemical Industries Limited, London, England
Filed Nov. 29, 1965, Ser. No. 510,239
Claims priority, application Great Britain, Dec. 2, 1964, 49,017/64
Int. Cl. B01d 9/04
U.S. Cl. 62—124                             1 Claim

ABSTRACT OF THE DISCLOSURE

In fractional crystallizing apparatus, a helical pass is formed in the annulus between concentric casings by helically wound tubes in the annulus and contiguous to the casing. Inlets are provided to an end and intermediate the ends of the casing. An outlet is provided at the other end. A reverse heat pump is connected to the helically wound tubes.

---

This invention relates to the purification of crystallisable substances.

According to the invention there is provided a process for the purification of a crystallisable substance which comprises the steps of partly crystallising a body of substance to be purified, displacing remaining liquid relative to the crystals, remelting at least part of the crystals and displacing liquid in the opposite direction to the previous displacement.

It is preferred that the body is an elongated body.

As a result of the displacement of liquid following the crystallisation and remelting steps a purity gradient is established along the length of the body containing the crystallisable substance and purified subsance and impurities tend to migrate towards opposite ends of the body. Impurities tend to migrate in the direction of the displacement of liquid following crystallisation and purified substance in the opposite direction. Purified substance or liquid containing an increased proportion of impurities i.e. mother liquor, may be withdrawn, preferably discontinuously, at or near the opposite ends of the body towards which liquid is displaced. It is preferred that impure substance i.e. liquid containing an increased proportion of impurities, is withdrawn after the displacement of liquid following the crystallisation step and also that purified substance is withdrawn after the displacement of liquid following the remelting step. Further, it is preferred that purified substance is not withdrawn until the desired purity has been achieved.

Crystallisation should at least be effected at and for some distance from the end of the body of substance from which purified substance is to be removed and is preferably effected throughout the body of substance.

The steps of the process of the invention may be repeated any desired number of times. The process may be operated continuously and fresh material introduced as required. Normally the amount of fresh material should be sufficient to maintain the volume of substance undergoing purifiication substantially constant and it is convenient to introduce fresh material when impure substance or purified substance is withdrawn. It is preferred to introduce fresh material at a point some distance from the ends of the body of substance for example at or near the middle of the body.

The products of the process, especially partly purified substances, may be re-introduced into the body suitably in the same way as the fresh material. This recycle of the products of the process may be useful when starting-up the process.

Crystallisation and remelting of the substance undergoing purification may be effected by indirect heat exchange with a heat transfer medium. This heat exchange may be effected in a variety of types of heat exchanger apparatus. For example, the substance undergoing purification may be contained in a vessel in which coils are located through which heat transfer medium may be circulated. These coils may be continuous or a number of separate coils may be used so that the temperature and the rate of refrigeration may be controlled differently in different parts of the vessel. This method of control may be particularly desirable when the feed material is very impurse and consequently the concentration of impurities and hence the freezing point of the material varies appreciably along the length of the vessel.

Again a plate-type heat exchanger for example a plate fin heat exchanger, may be used in which alternate layers of substance undergoing purification and heat transfer medium are separated by metal plates.

It is a feature of the invention to carry out the process in two or more heat exchangers linked to a common heat transfer system in such a way that the latent heat liberated by the crystallisation of the substance undergoing purification in one exchange is used to effect melting of crystals in another exchanger. In this heat transfer system a heat transfer medium such as liquid butane may be passed through a thermodynamic cycle in which it is evaporated in one exchanger, then compressed and condensed in another exchanger.

The process of the invention is applicable to the purification of a large variety of crystallisable substances. Examples of such substances are phenol, para-xylene and dichlorbenzenes.

It is a further feature of the invention to provide an apparatus suitable for carrying out the process of the invention which comprises an elongated vessel provided with outlets at or near its ends and an inlet at intermediate point, heat transfer means adapted to effect the transfer of heat to and from the vessel and means for applying a pressure differential between the ends of the vessel. Thus for example the apparatus may comprise an inner casing, a metal tube or tubes spirally wound on the casing and an outer casing fitting on the metal tube or tubes to define an elongated helical vessel between the casings, outlets at or near the ends of the helical vessel, an inlet intermediate the outlets and means for applying a pressure differential between the ends of the helical vessel. A heat exchange medium may be passed through the metal tube or tubes.

The dimensions of the elongated vessel depend upon the throughput and purity of the product required. The length of the vessel should exceed its diameter and will usually be many times its diameter.

In operation the vessel is filled with the substance to be purified, preferably at a temperature just above its melting point, and a heat exchange medium passed through the heat transfer means to effect crystallisation of the substance in the vessel. When crystallisation has proceeded to the required extent the remaining liquid is displaced towards one end of the vessel and some of this liquid in which impurities tend to be concentrated may be withdrawn. A further quantity of substance to be purified may now be introduced into the vessel and a heat trnansfer medium at a temperature sufficiently high to melt at least some of the solid passed through the heat transfer means. At or towards the end of the melting period liquid is displaced towards the other end of the vessel and some of this liquid, i.e. purified material may be withdrawn. A further quantity of substance to be purified may then be introduced into the vessel.

The present invention will be apparent to those skilled in the art upon study of the accompanying disclosure and drawings in which:

FIGURE 1 is a longitudinal fragmentary cross-sectional view, with portions shown in elevation, of one embodiment of the apparatus of this invention;

FIGURE 2 is an end view of the apparatus of FIGURE 1;

Figure 3:
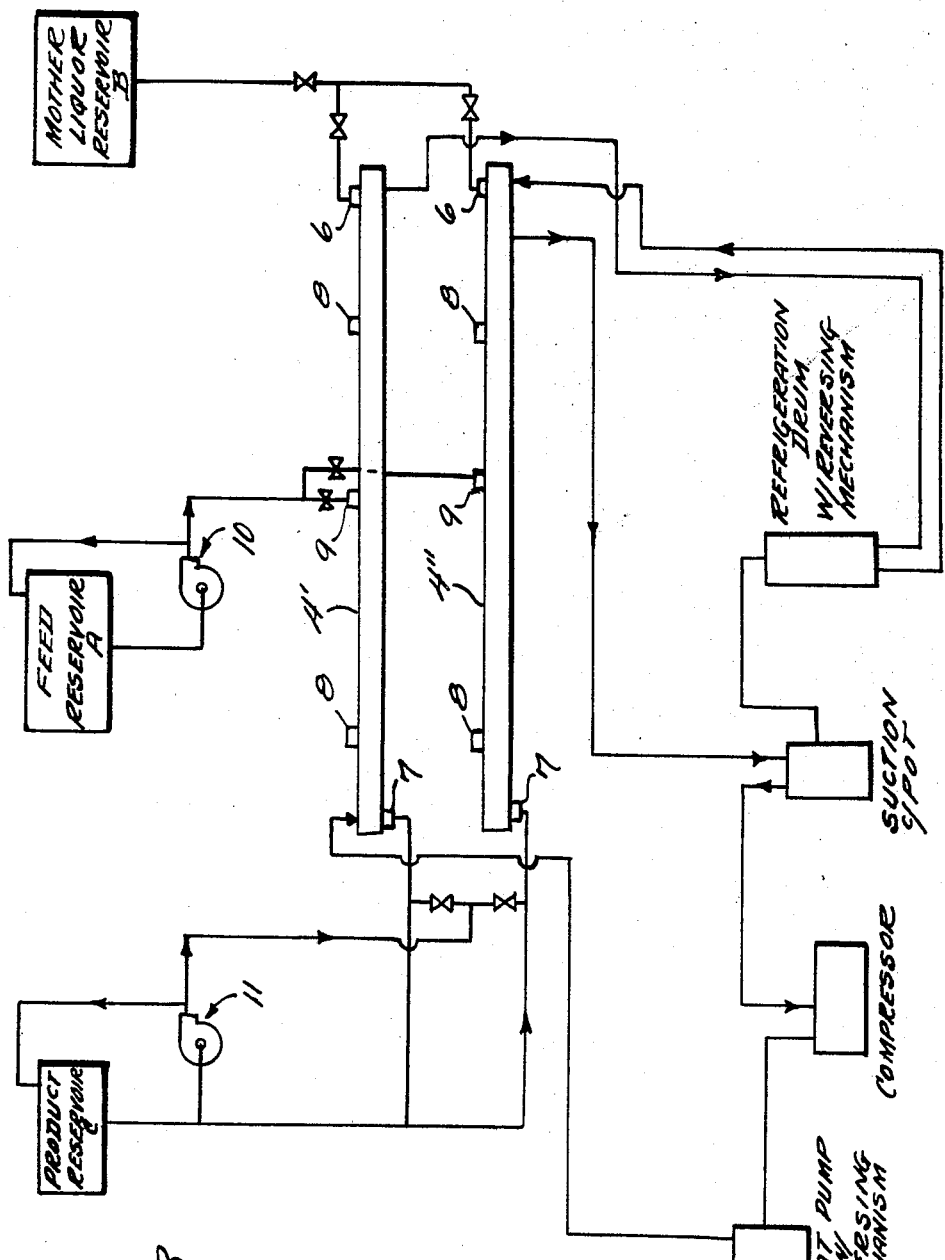
FIGURE 3 is a highly schematic drawing of the apparatus of FIGURE 1 used in combination with a similar apparatus and linked to a common heat transfer system.

Referring now to FIGURES 1–3, two copper tubes 1 and 2 each of 0.25 inch external and 0.18 inch internal diameter are spirally wound together in the manner shown around a copper tube 3 of 1.11 inch external diameter so that the winding extends over approximately 45 inches of the length of copper tube 3. The copper tubes 1 and 2 are joined beyond the ends of the apparatus so that they are effectively in parallel and have a common inlet and outlet. The lines of contact between the three tubes are completely sealed by soft solder. This assembly is tightly located within a further copper tube 4 so as to define a helical space 5 having 28 turns and a volume of 1.51 litres, between tubes 3 and 4. The helical space is provided with an inlet pipe 9 at turn No. 11, pipes 6 and 7 at opposite ends of the space and sample points 8 at a number of points between pipes 6 and 7. Means 10 are provided for applying pressure to pipes 6 and 7.

This apparatus was used in the following examples which illustrates a method of carrying out the process of the invention.

Another embodiment of the present invention is shown in FIGURE 3 which illustrates the use of two refiner assemblies 4' and 4" which are constructed essentially as shown in FIGURE 1. The heat transfer system illustrated in FIGURE 3 depicts the flow of heat transfer medium, e.g. liquid butane, when assembly 4' is being heated and assembly 4" is being cooled. When it is desired to cool assembly 4' and heat assembly 4", the direction of flow is reversed by actuating the appropriate reversing mechanisms. The assemblies 4' and 4" are connected to the feed, mother liquor and product reservoirs A, B and C, essentially in the same manner via inlet 9 and outlets 6 and 7, respectively as shown in FIGURE 1.

EXAMPLE 1

The apparatus was used to purify a mixture of xylene isomers containing 91.6% by weight of p-xylene.

The inlet pipe, pipe 6 and pipe 7 were connected respectively to reservoirs A, B and C to which air-pressure could be applied for the purpose of forcing liquid into the helical space by pump means 10 and 11. The helical space was filled with the mixture of xylene isomers at about 15° C. and reservoirs A and C were partly filled with the same mixture. Reservoir B was initially empty.

Cooling of the mixture of xylene isomers in the helical space was effected by passing aqueous methanol containing 60% by volume of methanol at a rate of 250 cc. per minute through copper tubes 1 and 2. Similarly, heating of the mixture of xylene isomers was effected by use of water at 18° C.

A purity gradient along the length of the helical space was first established by carrying out a series of alternate cooling and heating operations. In the cooling operation some of the paraxylene in the mixture was crystallised while in the heating operation part of the crystalline product was remelted. The details of these operations and the volumes of material in the reservoirs were as follows:

| Operation | Volume in Reservoirs (cc.) | | |
|---|---|---|---|
| | B | A | C |
| Initial volumes | 0 | 495 | 200 |
| Cycle 1: | | | |
| (1) Cooled for 8½ minutes with reservoir A open to helical space. Methanol inlet temperature −18° C.; final exit temperature 3° C | 0 | 385 | 200 |
| Note.—The volume in A diminished due to volume changes occurring on crystallisation which indicated the amount of crystallisation taking place. | | | |
| (2) Pressure applied to C and 50 cc. liquid forced through helical space to B and rejected | 0 | 385 | 150 |
| (3) Liquid transfer C to B completed | 150 | 385 | 0 |
| (4) Warmed for 12 mins. with reservoir B open to helical space | 250 | 385 | 0 |
| (5) Pressure applied to B and liquid forced through helical space to C | 0 | 385 | 260 |
| Note.—Increase in total volume is due to further melting of p-xylene crystals during liquid transfer. | | | |
| (6) 20 cc. sample taken from C | 0 | 385 | 240 |
| Cycle 2: | | | |
| (1) Cooled for 10 minutes with reservoir A open to helical space. Methanol inlet temperature −14° C.; final exit temperature 7° C | 0 | 295 | 240 |
| (2) 50 cc. liquid forced from C through helical space to B and rejected | 0 | 295 | 190 |
| (3) Liquid transfer C to B completed | 190 | 295 | 0 |
| (4) Warmed for 12 minutes with reservoir B open to helical space | 280 | 295 | 0 |
| (5) Part of liquid in B forced through helical space to C | 85 | 295 | 195 |
| (6) 20 cc. sample taken from C | 85 | 295 | 175 |

Cycles 3–11

As cycle 2. Any liquid in reservoir B at the beginning of a cycle was drawn into the helical space during the cooling step. Additional amounts of the mixture of xylene isomers were introduced into reservoir A as required.

The following table gives the percentage of p-xylene in the samples taken from reservoir C at the end of each cycle:

| Cycle No.: | Percent p-xylene |
|---|---|
| 1 | 93.5 |
| 2 | 94.6 |
| 3 | 95.2 |
| 4 | 96.2 |
| 5 | 97.2 |
| 6 | 97.8 |
| 7 | 98.7 |
| 8 | 99.1 |
| 9 | 99.3 |
| 10 | 99.3 |
| 11 | 99.6 |

A satisfactory purity gradient along the length of the helical space having been achieved operations were continued on a production basis in the following manner:

| Operation | Volume in Reservoirs (cc.) | | |
|---|---|---|---|
| | B | A | C |
| Initial volumes | 0 | 250 | 200 |
| (1) Cooled for 11 minutes with methanol inlet temperature at −11° C. Final exit temperature of methanol 8° C | 0 | 135 | 200 |
| (2) 85 cc. liquid forced from A through helical space to B and first 60 cc. entering B rejected | 15 | 50 | 200 |
| (3) Liquid forced from C to B through helical space | 200 | 50 | 0 |
| (4) Warmed with water for 20 minutes with reservoir B open to helical space | 340 | 50 | 0 |
| (5) Liquid forced from B through helical space to C and the first 160 ml. entering C removed as product | 0 | 50 | 180 |
| (6) Liquid forced from A to C and additional feed introduced into A | 0 | 490 | 200 |

This cycle of operations was then repeated nine times to produce 9×160=1440 cc. p-xylene of 99.6% purity.

EXAMPLE 2

A mixture of dichlorobenzenes containing 95.8% paradichlorobenzene was purified using the apparatus and procedure described in Example 1. The cooling medium was water at about 41° C. and the heating medium was water at about 60° C. A product containing 99.6% p-dichlorobenzene was obtained.

Figure 4:
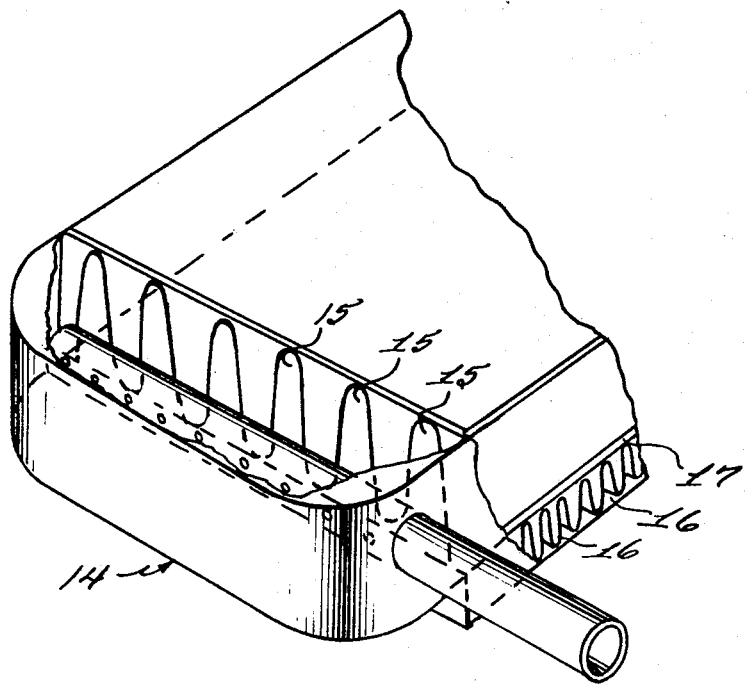
FIGURE 4 is a fragmentary perspective view of another embodiment of the apparatus of this invention.

FIGURE 4 shows a plate-type heat exchanger 14, for example a plate fin heat exchange. Alternate layers 15 and 16 are provided wherein the substance undergoing purification is introduced into layer 15 while heat transfer medium is introduced into layer 16 and the layers are separated by a metal plate 17.

I claim:
1. Apparatus for the purification of a crystallisable substance which comprises an inner casing, a pair of metal tubes spirally wound on the casing and an outer casing fitting on the metal tubes to define an elongated helical vessel between said casings, an inlet adjacent one end of said outer casing in fluid communication with said elongated helical vessel and an outlet adjacent the other end of said outer casing in fluid communication with said vessel, an inlet intermediate said ends in fluid communication with said elongated helical vessel, said tubes being joined beyond said ends to provide a common inlet and outlet means and reverse heat pump means connected to said common inlet and outlet means.

References Cited

UNITED STATES PATENTS

| 895,192 | 8/1908 | Place | 62—40 X |
| 2,062,321 | 12/1936 | Levin | 62—13 X |
| 2,617,273 | 11/1952 | Findlay | 62—58 |
| 2,940,272 | 6/1960 | Croley | 62—58 |
| 3,132,096 | 5/1964 | Walton | 62—58 X |
| 3,253,419 | 5/1966 | Thomas | 62—58 |
| 3,182,463 | 5/1965 | Stearns | 62—58 |

NORMAN YUDKOFF, Primary Examiner

U.S. Cl. X.R.

62—58, 324, 394